(12) United States Patent
Sandell et al.

(10) Patent No.: US 8,130,850 B2
(45) Date of Patent: Mar. 6, 2012

(54) WIRELESS TRANSMISSION DEVICE

(75) Inventors: Magnus Stig Torsten Sandell, Bristol (GB); Justin Coon, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 584 days.

(21) Appl. No.: 12/234,999

(22) Filed: Sep. 22, 2008

(65) Prior Publication Data

US 2009/0086836 A1 Apr. 2, 2009

(30) Foreign Application Priority Data

Sep. 27, 2007 (GB) .................................. 0718865.9

(51) Int. Cl.
*H04L 27/28* (2006.01)
(52) U.S. Cl. ........ 375/260; 375/267; 375/299; 375/340; 375/347; 455/101; 455/132; 455/296; 455/500; 455/562.1; 370/203; 370/204; 370/206; 370/208; 370/210; 370/334
(58) Field of Classification Search .................. 375/260, 375/267, 299, 340, 347; 455/101, 132, 296, 455/500, 562.1; 370/203, 204, 206, 208, 370/210, 334
See application file for complete search history.

(56) References Cited

U.S. PATENT DOCUMENTS

| | | | |
|---|---|---|---|
| 6,404,783 | B1 | 6/2002 | Cimini, Jr. et al. |
| 2003/0169720 | A1 | 9/2003 | Sebastian et al. |
| 2006/0023745 | A1* | 2/2006 | Koo et al. ..................... 370/468 |
| 2006/0034382 | A1* | 2/2006 | Ozluturk et al. .............. 375/267 |
| 2007/0036066 | A1 | 2/2007 | Thomas et al. |

FOREIGN PATENT DOCUMENTS

| | | |
|---|---|---|
| EP | 1 320 212 A2 | 6/2003 |
| EP | 1 320 212 A3 | 6/2003 |

* cited by examiner

*Primary Examiner* — Leon Flores
(74) *Attorney, Agent, or Firm* — Oblon, Spivak, McClelland, Maier & Neustadt, L.L.P.

(57) ABSTRACT

A method and device for managing the use of antennas in a multiple antenna wireless transmission system for OFDM signals. The method includes defining a utility function which comprises a performance metric for transmission. Combinations of antenna and OFDM subcarriers are selected to optimize the utility function under two constraints. The first constraint is that the combinations of antenna and subcarrier include only one antenna for each subcarrier, the second constraint is that the combinations include the same number of subcarriers for each antenna.

15 Claims, 3 Drawing Sheets

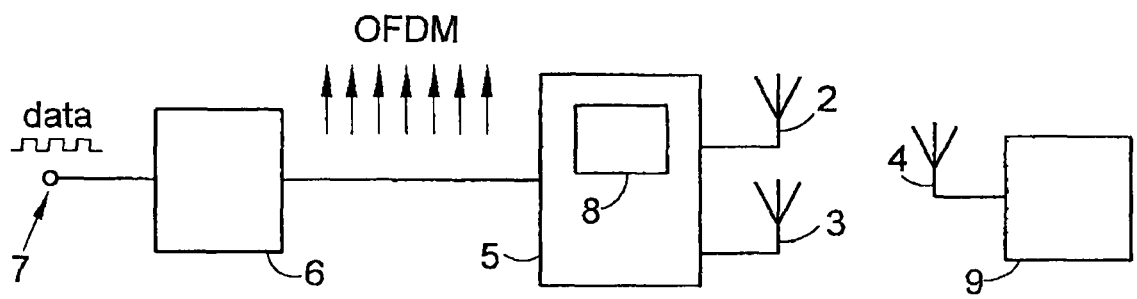
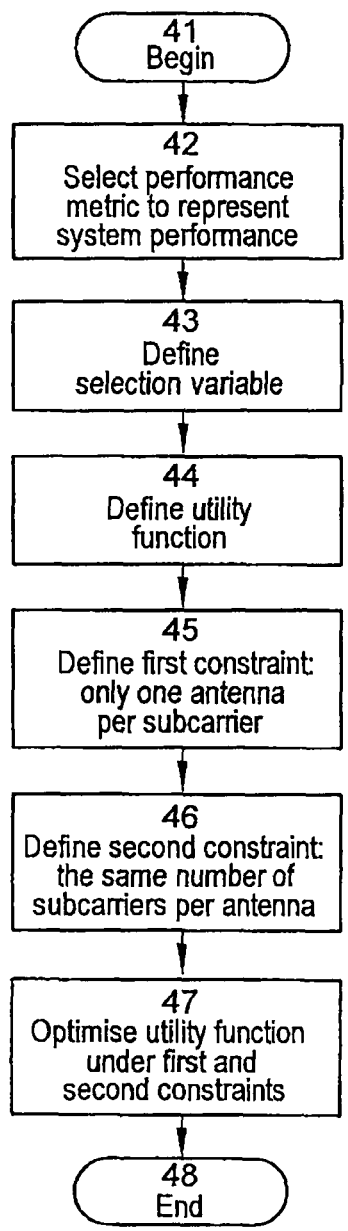
Fig.1
Fig.2

WIRELESS TRANSMISSION DEVICE

BACKGROUND OF THE INVENTION

1. Field of the Invention

The present invention relates to precoding for wireless transmissions. In particular, the invention relates to precoding for wireless transmission systems with multiple antennas. Further in particular, the invention relates to preceding for transmission systems with multiple antennas transmitting signals with multiple subcarriers. Yet further in particular, the invention relates to preceding for orthogonal frequency divisional multiplexed (OFDM) signals.

2. Discussion of Background

It is well known that the use of multiple-element antenna arrays can improve the performance of wireless communication systems. This has lead to widespread use of multiple-input single-output (MISO) and multiple-input multiple-output (MIMO) wireless systems, where 'input' refers to transmission antennas and 'output' refers to reception antennas.

It is also well known that the technique often referred to as preceding improves the performance of these wireless systems. Performance can be improved in terms of factors such as link quality and/or system capacity.

In multiple antenna transmission systems, preceding involves pre-processing signals transmitted to account for known characteristics of a given transmission channel. Precoding generally involves altering which signals, or components of signals are transmitted from given antenna or vice versa.

In systems which transmit orthogonal frequency division multiplexed (OFDM) signals, given antenna or antenna elements can be allocated on the basis of subcarrier frequencies within the OFDM signal. This allocation is sometimes referred to as per-subcarrier selection. In MISO systems, for example, a single data stream can be 'beam-formed' using appropriate antenna allocations to improve link quality, in terms of bit-error rates.

The degree to which channels of a multiple antenna system can be improved by preceding can be limited by constraints on power transmission. One such constraint is known as effective isotropic radiated power (EIRP), being a constraint on power radiated in any direction. Such constraints can lead to a need to reduce, or 'back-off', powers radiated, in response to preceding adjustments. This is, the power transmitted is reduced to prevent the power in a direction of maximum power to exceed a given limit. This will lead to a limit on the performance of a link. These limits are often imposed by transmissions standards, such as WiMedia.

One approach to avoiding maximum transmission power in one direction exceeding an EIRP constraints may be to transmit from only one antenna at a time. This will ensure that the transmitted power is the same in all directions and avoid the need to reduce transmission power. However, this approach limits the efficacy of preceding. It may also lead to losses associated with switching between antennas.

Another approach for controlling radiated powers, applied to OFDM systems, may be to select antennas for transmission on a per-subcarrier basis. This approach would appear particularly effective in conforming to standards such as WiMedia where transmission power limits are defined on a per-frequency basis. Am example of this approach is given in the paper 'An adaptive antenna selection scheme for transmit diversity in OFDM systems', by Shi, M. Katayama, T. Yamazato, H. Okada, A. Ogawa, VTC Fall, 2001, vol 4, pp 2168-2172, October 2001. In this example, antennas are selected for each subcarrier according to a priori knowledge of the attenuation for each subcarrier represented by each antenna. The main drawback with this method is that antennas are chosen on an ad hoc basis. The method does not choose optimally on which antennas to transmit. The invention overcomes this by formulating the antenna selection as an integer optimisation problem with constraints.

Per-subcarrier antenna selection suffers a limitation that one antenna may be allocated more subcarriers than others and will, therefore, transmit more power. This imbalance of power between antennas is problematic for the associated power amplifiers and, again, may lead to a need to reduce transmission powers, which limits performance.

Another approach may be to select antennas on the basis of compete bands of transmission frequencies. For example, all subcarriers of an OFDM channel may be transmitted on only one antenna. This approach may also limit the effectiveness of precoding compared with approaches which allow antenna selection on the basis on individual subcarrier frequencies. This approach may also encounter limitations arising from losses in switching between antennas on the basis of frequencies bands. In contrast, switching on the basis of OFDM subcarrier frequencies can be done digitally with two or more antennas transmitting simultaneously.

SUMMARY OF THE INVENTION

An aspect of the present invention provides a method of applying preceding to a multiple antenna transmission system by optimising a utility function involving channel performance under constraints on the number of subcarriers per antenna.

This approach allows a multiple antenna transmission system to be optimised for performance while balancing the transmission powers across different antennas. This allows relatively high transmission powers before isotropic power constraints are exceeded, which avoids the need to reduce transmission powers to avoid exceeding isotropic power constraints.

In one aspect the present invention provides a method of selecting antennas for a multiple antenna wireless transmission system for signals comprising two or more subcarriers, said transmission system being operable to transmit signals using selected combinations of antenna and subcarrier, the method comprising:

defining a utility function comprising a performance metric representing the performance of a channel for combinations of antenna and subcarrier;

defining a first constraint that the selected combinations of antenna and sub-carrier include only one antenna for each subcarrier;

defining a second constraint that the selected combinations of antenna and sub-carrier include substantially the same number of subcarriers for each antenna;

selecting combinations of antenna and subcarrier so as to optimise the utility function subject to the first and second constraints.

As used herein, a utility function is intended to have a meaning within the field of mathematical optimisation as being the function by which an optimisation is evaluated. In this context the term 'utility' is given a broad interpretation and an 'optimisation' may seek to maximise the 'utility function' or may seek to minimise it, depending on the nature of the utility function.

The first constraint may be defined as a requirement that only one antenna is transmitting per subcarrier.

The first constraint may be described mathematically as:

$$\sum_m x_{k,m} = 1, \forall k,$$

wherein represents subcarrier and m represents antenna and $x_{k,m} \in \{0,1\}$ represents a selection variable defining combinations of antenna and subcarrier and having a value of 1 for a selected combination and 0 otherwise.

The second constraint may be defined as a requirement that the sum of all subcarriers to which each antenna is allocated does not diverge by substantially more than one over the range of antennas.

The second constraint may be defined as:

$$\sum_k x_{k,m} \leq \left\lceil \frac{K}{M} \right\rceil, \forall m,$$

wherein k represents subcarrier, m represents antenna, $x_{k,m}$ represents a selection variable defining combinations of antenna and subcarrier, M represents the total number of antennas and K represents the total number of subcarriers, and wherein $x_{k,m}$ has a value of 1 for a selected combination and 0 otherwise.

Antenna selection may be formulated as an integer optimisation problem with constraints. The utility function may be defined as $$f(x) = \sum_{k,m} x_{k,m} C_{k,m}, x_{k,m} \in \{0, 1\}$$

subject to the constraints $$\sum_m x_{k,m} = 1, \forall k \text{ and } \sum_k x_{k,m} \leq \left\lceil \frac{K}{M} \right\rceil, \forall m.$$

The performance metric $C_{k,m}$ may be defined as a function of the channel gains $H_{k,m}$. The performance metric may be channel capacity. Channel capacity may be defined as:

$$C_{k,m} = \log_2\left(1 + \frac{\sigma_x^2}{\sigma_v^2} \cdot |H_{k,m}|^2\right),$$

where $\sigma_x^2$ and $\sigma_v^2$ are the average data symbol power and channel noise power, respectively. Another performance metric may be channel power $C_{k,m}=|H_{k,m}|^2$. In both those cases, the maximum of the utility function is sought.

The performance metric may be the bit-error rate. The bit error rate may, in the case of BPSK modulation, be:

$$C_{k,m} = Q\left(\sqrt{\frac{2\sigma_x^2 |H_{k,m}|^2}{\sigma_v^2}}\right),$$

where Q( ) is the Q-function. In this case the utility function should be minimised.

The above metrics reflects the utility of transmitting on antenna m on subcarrier k in embodiments of the present invention with one receive antenna. In embodiments with multiple receive antennas, say N, the metrics can be defined to measure the combined effects of the antennas. For instance, for capacity we may have:

$$C_{k,m} = \log_2\left(1 + \frac{\sigma_x^2}{\sigma_v^2} \cdot \sum_{n=1}^{N} |H_{k,m}|^2\right),$$

for channel power $$C_{k,m} = \sum_{n=1}^{N} |H_{k,m}|^2,$$

and for bit-error rate $$C_{k,m} = Q\left(\sqrt{\frac{2\sigma_x^2 \sum_{n=1}^{N} |H_{k,m}|^2}{\sigma_v^2}}\right).$$

The optimisation may include minimising said utility function over $x_{k,m}$.

The optimisation may include minimising said utility function over k and m.

The letter k may represent selected groups of subcarriers. This may allow optimisation over fewer variables.

Alternatively, k may represent individual subcarriers.

The optimisation may include integer optimisation.

The optimization of the utility function may include linear relaxation.

The optimisation of the utility function may include applying a linear programming method.

The linear programming method may comprise the simplex method.

The optimisation may include applying a branch-and-bound optimisation method.

The signal may be an orthogonal frequency division multiplexed signal.

In another aspect the invention provides a multiple-antenna wireless transmission system for transmitting signals comprising two or more subcarriers to a receiver, the system comprising:
  an antenna selector configured to select antennas for transmission of individual sets of subcarrier components; and
  a data store for data characterising a performance metric for transmissions received by the receiver said metric defined by given selections of antennas for sets of subcarriers;
  wherein the antenna selector is configured to calculate a utility function comprising said performance metric and to select antennas for sets of subcarriers so as to optimise the utility function according to a first constraint that substantially only one antenna is selected for each set of subcarrier components and according to a second constraint that for a given antenna is selected for substantially the same number of sets of subcarrier components.

The signal may comprise an orthogonal frequency division multiplexed signal.

BRIEF DESCRIPTION OF THE DRAWINGS

FIG. 1 is a schematic diagram depicting MISO OFDM system with per-subcarrier selection of antenna according to a preferred of the present embodiment.

FIG. 2 is a flow diagram of a method performed according to the same preferred embodiment of the present invention as FIG. 1 and Table 1;

DETAILED DESCRIPTION OF THE PREFERRED EMBODIMENTS

Figure 3:
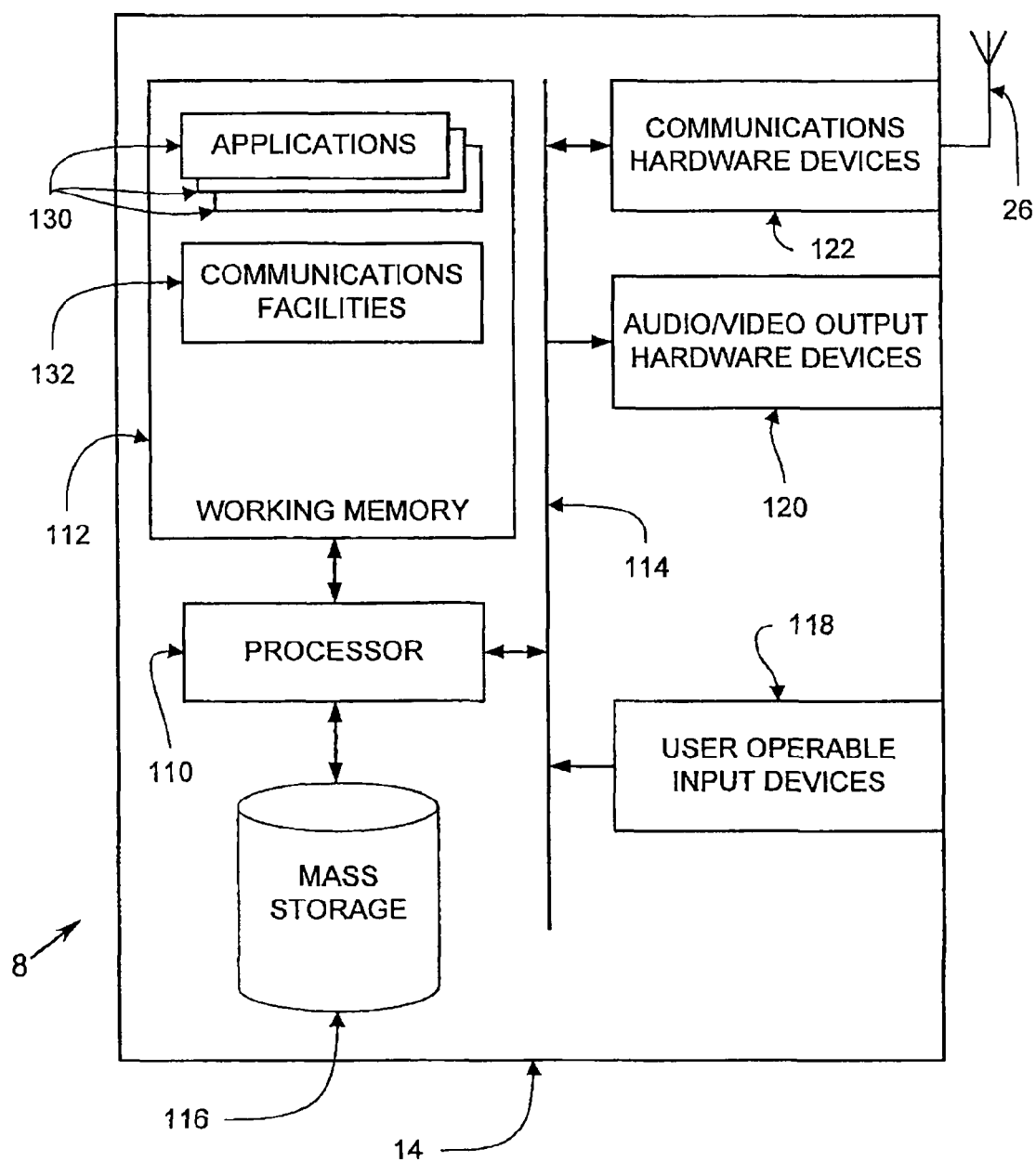
FIG. 3 is a schematic diagram of a controller operable to carry out a method according to the same preferred embodiment of the present invention as FIGS. 1 and 2.

FIG. 1 shows a MISO transmission system 1. The system has two input antenna 2 and 3 and a single output antenna 4. It will be apparent to those skilled in the art that this transmission system 1 is a simple example given to illustrates the operation of the preferred embodiment.

The transmission system 1 has a space-time encoder, which is capable of selecting individual antennas, such as antenna 2 and antenna 3 on individual subcarriers of an OFDM signal. Those skilled in the art may recognise this type of space-time encoding as 'per-subcarrier antenna selection' and recognise the space-time encoder as an antenna selector.

The space-time encoder 5 is supplied an OFDM signal by a channel encoder 6 which, according to the preferred embodiment includes a channel interleaver (not shown). The channel encoder 6 is supplied by a data stream from a data input 7. The space-time encoder 5 includes a controller, computer or processor, 8. The controller 8 is capable of obtaining data relating to performance metrics for transmission. This data may be obtained by means such as channel reciprocity or feedback. Communication with the data input and receiver allows the controller to determine performance matrices of transmission channels of the system 1, such as the bit-error rates or channel capacity or matrix relating to the magnitude of the channel transfer function. Those skilled in the art will be aware of alternative means for determining these matrices and will appreciate that the controller 8 may be incorporated within to the space-time encoder 6. In the preferred embodiment described herein, the controller 8 has a computer which carries out precoding optimisation for the system 1.

A numerical example is given to illustrate the invention. Assume a system with M=3 antennas and K=8 subcarriers where the performance metric is chosen to be the channel capacity. The performance metrics, being channel capacity, $C_{k,m}$, k=1, ..., 8, m=1, ..., 3 are given as follows, where the rows represent antennas and the columns represent subcarriers:

| 0.1389 | 0.6038 | 0.0153 | 0.9318 | 0.8462 | 0.6721 | 0.6813 | 0.5028 |
| 0.2028 | 0.2722 | 0.7468 | 0.4660 | 0.5252 | 0.8381 | 0.3795 | 0.7095 |
| 0.1987 | 0.1988 | 0.4451 | 0.4186 | 0.2026 | 0.0196 | 0.8318 | 0.4289 |

The unconstrained solution would pick the best values of the metric from each column (largest value so as to maximise capacity), which means that $x_{k,m}$ would be

| 0 | 1 | 0 | 1 | 1 | 0 | 0 | 0 |
| 1 | 0 | 1 | 0 | 0 | 1 | 0 | 1 |
| 0 | 0 | 0 | 0 | 0 | 0 | 1 | 0 |

Although the total capacity is maximised at 5.7108, the power is imbalanced since antennas 1,2 and 3 have 3,4 and 1 subcarriers, respectively. This means that antenna 2 will transmit four times the power of antenna 3. According to the preferred embodiment of the present invention, optimisation is performed with first and second constraints $$\sum_{m=1}^{3} x_{k,m} = 1, \sum_{k=1}^{8} x_{k,m} \leq \left\lceil \frac{8}{3} \right\rceil = 3.$$

The solution of this optimisation is:

| 0 | 1 | 0 | 1 | 1 | 0 | 0 | 0 |
| 0 | 0 | 1 | 0 | 0 | 1 | 0 | 1 |
| 1 | 0 | 0 | 0 | 0 | 0 | 1 | 0 |

Here, the total capacity is 5.7067, which is close to that of an unconstrained optimisation. The power is now relatively balanced since antennas 1,2 and 3 are selected for 3,3 and 2 subcarriers, respectively.

Those skilled in the art will appreciate that slight deviations from these constraints may have an immaterial effect on preceding optimisation performed according to the invention. A deviation may cause the radiated power of a system measured in the direction of maximum power to exceed an EIRP constrain and may, therefore, lead to a need to reduce transmission power and a corresponding degradation of system performance. A deviation from the first constraint may, for example, lead to interference if two antennas are selected for the same subcarriers. However, it will be apparent to the skilled addressee than minor deviations from these constraints may, in given circumstances, not cause any material degradation of system performance.

It will be apparent to those skilled in the art that this optimization problem can be solved by a number of techniques apparent to those skilled in the art. These techniques may involve linear relaxation, which assumes that integer variables such as $x_{k,m}$ can take on continuous values. This allows linear programming techniques such as the simplex method and revised simplex method to be used. It will also be apparent to those skilled in art that other techniques such as branch-and-bound optimisations may be used as alternatives. An alternative embodiment may take advantage of knowledge of the channel such as the magnitude of the channel transfer function. This may be discovered through feedback from the receiver 9 of FIG. 1, to the controller 8 or may be determined by techniques such as reciprocity. Suitable reciprocity or feedback schemes will be apparent to those skilled in the art.

In the preferred embodiment, knowledge of the channel may be stored in a look-up table, for example, to be referred to during calculations of the utility functions.

One alternative embodiment of the present invention performs an optimization where k represents a group of subcarriers. In this case $C_{km}$ and $x_{km}$ represent the performance matrix and selection variable for the group k rather than the subcarrier k. Groupings of sub-carriers suitable to reduce complexity in given applications of the invention will be apparent to those skilled in the art.

FIG. 2 shows a precoding optimisation process 40 carried out by a controller 8, of FIG. 1, according to the preferred embodiment of the present invention.

The process begins at step 41.

At step 42 a performance metric is defined for the transmission system 1.

At step 43 a selection variable is defined. The selection variable of the preferred embodiment is defined as 1 where an antenna m is selected to transmit a subcarrier k and defined a 0 otherwise.

At step 44 a utility function is defined for the system 1. The utility function is the sum of products of a performance matrix, $C_{km}$, and the selection matrix, $x_{km}$. This sum is performed over all k and m.

At step 45 a first constraint is defined for the preceding optimisation. This constraint is that only one antenna per subcarrier can be used for a transmission.

At step 46 a second constraint is defined for the preceding optimisation. This constraint is that approximately the same number of subcarriers per antenna must be used for a transmission.

At step 47 the utility function is optimized according to the first and second constraints as an integer optimisation.

The utility function is defined as $$f(x) = \sum_{k,m} x_{k,m} C_{k,m}, \; x_{k,m} \in \{0, 1\}$$

subject to the constraints $$\sum_m x_{k,m} = 1, \; \forall \, k \text{ and } \sum_k x_{k,m} \leq \left\lceil \frac{K}{M} \right\rceil, \; \forall \, m.$$

The performance metric $C_{k,m}$ may be defined as a function of the channel gains $H_{k,m}$ in several ways. In one the preferred embodiments. The utility function may be channel capacity. Channel capacity may be defined as:

$$C_{k,m} = \log_2 \left( 1 + \frac{\sigma_x^2}{\sigma_v^2} \cdot |H_{k,m}|^2 \right),$$

where $\sigma_x^2$ and $\sigma_v^2$ are the average data symbol power and channel noise power, respectively. The performance metric may be defined as channel power $C_{k,m} = |H_{k,m}|^2$. In both those cases, the utility function is maximised.

In an alternative embodiment, the performance metric may be the bit-error rate. The bit error rate may, in the case of Binary {has Shift Keyed BPSK modulation, be $$C_{k,m} = Q\left( \sqrt{\frac{2\sigma_x^2 |H_{k,m}|^2}{\sigma_v^2}} \right),$$

where Q( ) is the Q-function. In this embodiment the utility function is minimised so as to minimise error rates.

The above metrics reflect the benefit of transmitting on antenna m on subcarrier k in embodiments of the present invention with one receive antenna. In embodiments with multiple receive antennas, say N, the metrics can be defined to measure the combined effects of the antennas. For instance, capacity may be defined as $$C_{k,m} = \log_2 \left( 1 + \frac{\sigma_x^2}{\sigma_v^2} \cdot \sum_{n=1}^{N} |H_{k,m}|^2 \right).$$

Channel power may be defined as $$C_{k,m} = \sum_{n=1}^{N} |H_{k,m}|^2.$$

Bit Error Rate may be defined as $$C_{k,m} = Q\left( \sqrt{\frac{2\sigma_x^2 \sum_{n=1}^{N} |H_{k,m}|^2}{\sigma_v^2}} \right).$$

In the preferred embodiment, the utility function may be optimised with the means of integer optimisation (since $x_{k,m}$ is restricted to the integer values 0 and 1). Suitable integer optimisation techniques, such as branch-and-bound optimisation, will be apparent to those skilled in the art. It will be apparent to those skilled in the art that linear relaxation may be applied (removing the integer restriction on $x_{k,m}$) without loss of optimality. It will further be apparent that other optimisation techniques such as the Simplex method or Revised Simplex method may be applied.

The process ends at step 48 with a preceding matrix which represents antenna selections that optimise the utility function within the first and second constraints which minimise significant power imbalance between antennas.

The present invention may allow improved precoding optimisation for transmission systems which must conform to EIRP constraints by allowing preceding optimisation with all antennas having the same power. This may enhance the performance of the system by eliminating the need to reduce power of power amplifiers associated with antenna or to force power amplifiers to operate in power regimes which are inefficient.

FIG. 3 illustrates schematically hardware operably configured (by means of software or application specific hardware components) as the controller 8. The controller 8 comprises a processor 110 operable to execute machine code instructions stored in a working memory 112 and/or retrievable from a mass storage device 116. By means of a general purpose bus 114, user operable input devices 118 are capable of communication with the processor 110. The user operable input devices 118 comprise, in this example, a keyboard and a mouse though it will be appreciated that any other input devices could also or alternatively be provided, such as another type of pointing device, a writing tablet, speech recognition means, or any other means by which a user input action can be interpreted and converted into data signals.

Audio/video output hardware devices 120 are further connected to the general purpose bus 114, for the output of information to a user. Audio/video output hardware devices 120 can include a visual display unit, a speaker or any other device capable of presenting information to a user.

Communications hardware devices 122, connected to the general purpose bus 114, are connected to the antenna 26. In the illustrated embodiment in FIG. 3, the working memory 112 stores user applications 130 which, when executed by the processor 110, cause the establishment of a user interface to enable communication of data to and from a user. The applications in this embodiment establish general purpose or specific computer implemented utilities that might habitually be used by a user.

Communications facilities 132 in accordance with the specific embodiment are also stored in the working memory 112, for establishing a communications protocol to enable data generated in the execution of one of the applications 130 to be processed and then passed to the communications hardware devices 122 for transmission and communication with another communications device. It will be understood that the software defining the applications 130 and the communications facilities 132 may be partly stored in the working memory 112 and the mass storage device 116, for convenience. A memory manager could optionally be provided to enable this to be managed effectively, to take account of the possible different speeds of access to data stored in the working memory 112 and the mass storage device 116.

On execution by the processor 110 of processor executable instructions corresponding with the communications facilities 132, the processor 110 is operable to establish communication with another device in accordance with a recognised communications protocol. Between the communications facilities 132, the processor 110 and the communications hardware devices 122, the wireless terminal 14 is configured to provide facilities as in the wireless access point for the establishment of transmission and reception of data over the MIMO channel 28.

Figure 4:
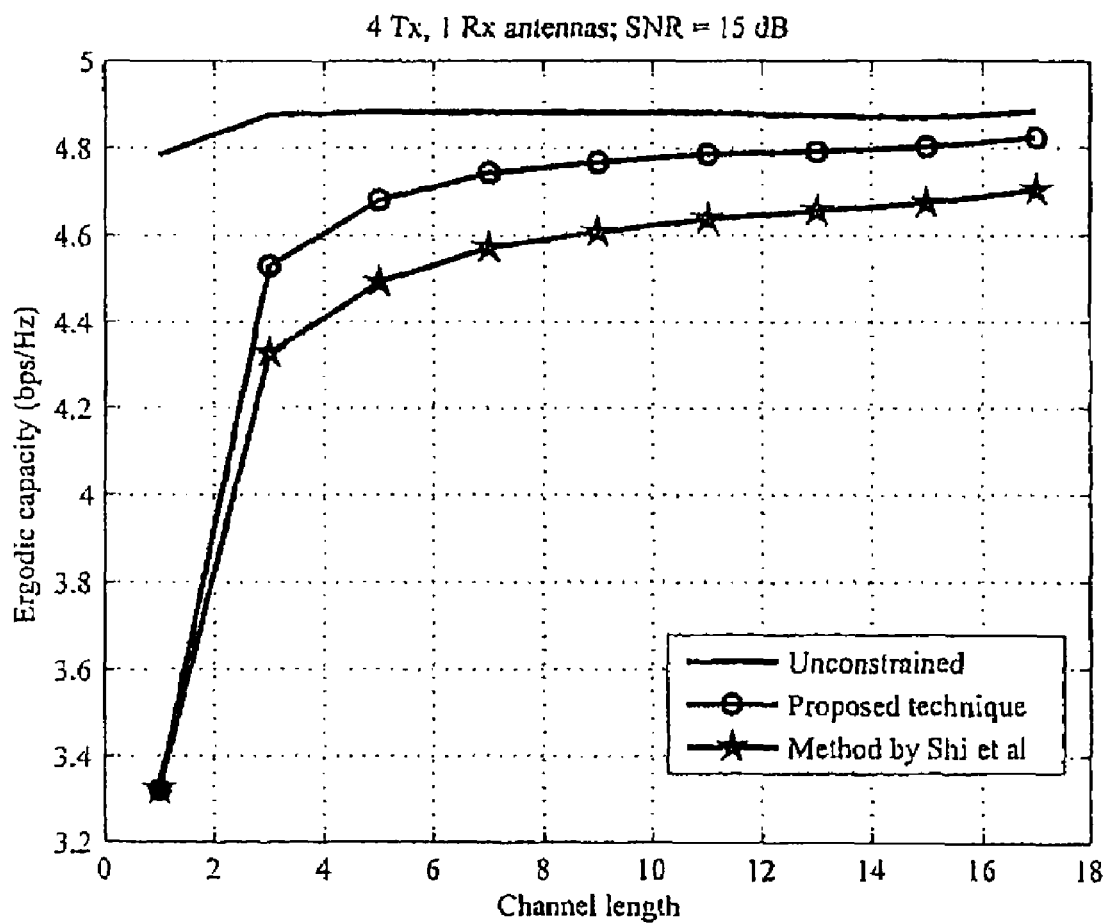
FIG. 4 shows the results of a simulation of the preferred embodiment of the present invention.

FIG. 4 illustrates the improvement of performance of a MISO transmission system provided by the present invention. These results are provided by a simulation of an embodiment of the present invention and simulations of conventional alternatives to the present invention.

FIG. 4 shows a graph with channel length, in units of samples, shown on the abscissa while ergodic capacity in the units of bits per second per hertz are shown on the ordinate.

The graph shows representations of conventional 'unconstrained' system which, although expected to show the best performance, cannot be guaranteed to remain within EIRP power constraints. Also represented by the legend 'Proposed Technique' is a 'constrained' system according to a preferred embodiment of the present invention. The graph also shows a representation, with the legend 'Method by Shi et al' of a system which is optimised according to conventional/subcarrier antenna selection allocating the same number of subcarriers to all antennas. This conventional approach, discussed in the 'Background' section, optimises using a utility function defined in terms of channel capacity.

The representations shown on the graph in FIG. 4 are provided by a simulation of an OFDM MISO system with M=4 input antenna, k=64 OFDM subcarriers and a SNR of 15 dB. As apparent from FIG. 4 that, optimisation according to the present invention provides the highest performance of any system of optimisation which is constrained to ensure that the transmission power is within EIRP limits. In fact, it is apparent that for longer channel lengths the performance provided by optimisations according to the present invention is very close to the performance of an entirely unconstrained optimisation.

The reader will appreciate that the foregoing is but one example of implementation of the present invention, in that further aspects, variations and advantages may arise from using the invention in different embodiments. The scope of protection is intended to be provided by the claims appended hereto, which are to be interpreted in the light of the description with reference to the drawings and not to be limited to the above.

The invention claimed is:

1. A method of managing the use of antennas in a multiple antenna wireless transmission system for signals comprising two or more subcarriers, said transmission system being adapted to transmit signals using selected combinations of antenna and sub-carrier, the method comprising:
    defining a utility function comprising a performance metric representing the performance of a channel defined for combinations of antenna and subcarrier;
    defining a first constraint that the combinations of antenna and sub-carrier include one antenna for each subcarrier;
    defining a second constraint that combinations of antenna and sub-carrier include substantially the same number of subcarriers for each antenna;
    selecting combinations of antenna and sub-carrier so as to optimize the utility function according to the first and second constraints, including an integer optimization and applying a branch-and-bound optimization method.

2. The method of claim 1, wherein the first constraint is defined as only transmitting from one antenna on each sub-carrier.

3. The method of claim 1, wherein the second constraint is defined as all antenna having substantially the same number of subcarriers allocated to them.

4. The method of claim 1, wherein the performance metric comprises channel gain.

5. The method of any one of claims 1 to 4, wherein the performance metric comprises a Signal-to-Noise Ratio, SNR.

6. The method of claim 1, wherein the performance metric comprises channel capacity.

7. The method of claim 1, wherein the performance metric comprises bit error rate.

8. The method of claim 1, wherein the utility function is defined by:

$$f(x) = \sum_{k,m} x_{k,m} C_{k,m}.$$

wherein $C_{k,m}$ represents the performance metric, k represents subcarriers, m represents antennas, and $x_{k,m}$ represents a selection variable defining combinations of antenna and subcarrier.

9. The method of claim 8, wherein said selecting combinations to optimise said utility function includes maximising said utility function over all possible $X_{k,m}$.

10. The method of claim 8, wherein k represents selected groups of subcarriers.

11. The method of claim 8, wherein k represents individual subcarriers.

12. The method of claim 1, wherein the signal is an orthogonal frequency division multiplexed signal.

13. A method of managing the use of antennas in a multiple antenna wireless transmission system for signals comprising two or more subcarriers, said transmission system being adapted to transmit signals using selected combinations of antenna and sub-carrier, the method comprising:

defining a utility function comprising a performance metric representing the performance of a channel defined for combinations of antenna and subcarrier;

defining a first constraint that the combinations of antenna and sub-carrier include one antenna for each subcarrier;

defining a second constraint that combinations of antenna and sub-carrier include substantially the same number of subcarriers for each antenna;

selecting combinations of antenna and sub-carrier so as to optimise the utility function according to the first and second constraints, wherein said selecting combinations of antenna and sub-carrier so as to optimise the utility function includes linear relaxation.

14. The method of claim 13, wherein said selecting combinations of antenna and subcarrier so as to optimise the utility function includes applying a linear programming method.

15. The method of claim 14, wherein the linear programming method comprises a simplex method.

* * * * *